(12) United States Patent
Griffin et al.

(10) Patent No.: US 11,805,125 B2
(45) Date of Patent: Oct. 31, 2023

(54) TASK BASED ACCESS RIGHTS CONTROL

(71) Applicant: Microsoft Technology Licensing, LLC, Redmond, WA (US)

(72) Inventors: Daniel Carlyn Griffin, Seattle, WA (US); Anson Michael Horton, Bothell, WA (US); Ruben Josue Rios-Lopez, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 17/331,082

(22) Filed: May 26, 2021

(65) Prior Publication Data

US 2022/0385665 A1    Dec. 1, 2022

(51) Int. Cl.
H04L 29/06 (2006.01)
H04L 9/40 (2022.01)

(52) U.S. Cl.
CPC .................. H04L 63/101 (2013.01)

(58) Field of Classification Search
CPC .................................................. H04L 63/101
See application file for complete search history.

(56) References Cited

U.S. PATENT DOCUMENTS

| | | | | |
|---|---|---|---|---|
| 2008/0127135 A1* | 5/2008 | Bergstrom | ............... | G06F 8/447 717/140 |
| 2009/0228704 A1* | 9/2009 | de Atley | ................... | G06F 8/20 717/124 |
| 2013/0347076 A1* | 12/2013 | Marum | .......... | G06Q 10/063118 726/4 |
| 2015/0089601 A1* | 3/2015 | Marum | .......... | G06Q 10/063118 726/4 |
| 2020/0021591 A1* | 1/2020 | Hecht | ..................... | H04L 63/10 |
| 2020/0396222 A1* | 12/2020 | Gargaro | ................. | H04L 63/10 |

OTHER PUBLICATIONS

"SUNSPOT: An Implant in the Build Process", Retrieved from: https://www.crowdstrike.com/blog/sunspot-malware-technical-analysis/, Jan. 11, 2021, 19 Pages.

Arnott, Andrew, "SecurityManager Stubs Return Poor Results", Retrieved from: https://github.com/dotnet/runtime/issues/1698, Jan. 14, 2020, 4 Pages.

Brewster, Thomas, "Google Warning: North Korean Hackers Breach Windows and Chrome Defenses to Attack Security Researchers", Retrieved from: https://www.forbes.com/sites/thomasbrewster/2021/01/26/google-warning-north-korean-hackers-breach-windows-and-chrome-defenses-to-attack-security-researchers/?sh=189d0c2447b8, Jan. 26, 2021, 5 Pages.

(Continued)

*Primary Examiner* — Yonas A Bayou
(74) *Attorney, Agent, or Firm* — Schwegman Lundberg & Woessner, P.A.

(57) ABSTRACT

A computer implemented method includes detecting a current workstream of development tasks associated with a software development project. An activity attempting to access a resource is detected. Access rights to the resource are determined with respect to the activity as a function of the current workstream of development tasks. Access to the resource is controlled in accordance with the access rights.

20 Claims, 4 Drawing Sheets

(56) References Cited

OTHER PUBLICATIONS

Vangel, et al., "Microsoft Defender Application Guard overview", Retrieved from: https://docs.microsoft.com/en-us/windows/security/threat-protection/microsoft-defender-application-guard/md-app-guard-overview, Jan. 27, 2021, 4 Pages.

Weins, et al., "Configure Trust Settings for Files and Folders", Retrieved from: https://docs.microsoft.com/en-us/visualstudio/ide/reference/trust-settings?view=vs-2017, Sep. 5, 2018, 5 Pages.

"International Search Report and Written Opinion Issued in PCT Application No. PCT/US22/026862", dated Aug. 12, 2022, 11 Pages.

\* cited by examiner

TASK BASED ACCESS RIGHTS CONTROL

BACKGROUND

Software developers perform many tasks when developing software. Such tasks may include performing online research, source code authoring and reuse, experimenting, debugging, testing, and integration. Those operations are frequently performed with a greater level of network and computer user privilege than what is required. Software developers have access to network logon accounts that include valuable data and assets useful for developing software. While performing individual tasks, developer network accounts are being used to interact with internet websites and third-party source code, scripts, and packages. Any such site or content is a possible vector for malware which, if executed, can access the same valuable data to which the software developer has access.

SUMMARY

A computer implemented method includes detecting a current workstream of development tasks associated with a software development project. An activity attempting to access a resource is detected. Access rights to the resource are determined with respect to the activity as a function of the current workstream of development tasks. Access to the resource is controlled in accordance with the access rights.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Current software development operation network accounts have access either to internet websites and external development tools, or the account has access to a high-value production environment. However, the reality of the software developer productivity workflow consists of a loop of continuous incremental improvement, delivery, and deployment. Defining only two privilege levels—high, for the high-value production environment, and low for access to internet websites and external development tools—and treating them as disjoint is both inefficient and insecure. It is inefficient because it forces that developer to create an artificial break in the productivity loop to switch accounts, networks, tools, and/or even computers. It is insecure because the "low privilege" level is still potent given the access that it typically requires to the internet, third-party source code, and confidential data. The "high privilege" level is still vulnerable because, given the practical constraints of a distributed global workforce and software supply chain, accessing the production environment entails exposing it to third-party tools and the internet.

For any given software creation workstream of tasks, it is infeasible for a system administrator or developer to know a priori exactly what level of privilege is required. It is prohibitively expensive from a productivity and manpower standpoint to configure an environment with the minimum amount of privilege and then require human intervention—whether on the part of the sysadmin, the software developer, or both—for each requested privilege escalation that results. Even where some very high-value environments may justify that approach, the element of manual review introduces false positives such as requests for escalation are allowed which should not have been.

The exploitation of software development related business processes and tools is at an all-time high and is increasing exponentially year by year. The negative impact of this trend is compounded by the challenges previously mentioned because software development tools are employed by users with a high level of data and infrastructure access, exploitation of those tools results in high-impact vulnerabilities such as remote attacker-controlled execution of third-party, untrusted software.

A new privilege management system provides an improved method of granting access to computing resources, mitigating the risk of exposing valuable data and assets by granting only as much privilege is required for the developer to perform a task at hand. Privilege requirements are assessed and granted automatically for each task so that the workflow of the software developer is not interrupted.

Privilege is managed at the granularity of each step or task in the software development workstream and in a manner that is context aware and content aware. For example, a developer tasked with implementing a web application, using programming language X, will be able to seamlessly perform the individual steps required: research, write, test, debug, and deploy code. However, any attempt to perform a step with a different programming language or application type will be denied. The system permits access to multiple programming languages and app types in accordance with a given workstream.

The privilege management system allows software development privilege to be managed at a granular level across computers and users. The developer may perform any of the workflow steps—research, write, test, debug, and deploy code—in a way that is distributed, in parallel or sequentially, across multiple computers. Likewise, two or more developers may collaborate on one or more workflow steps in tandem using one or more computers. Any attempt to use a programming language, content, or app type other than what is required for the task or project will be blocked, regardless of which user or computer attempts it.

The privilege management system enforces a resultant set of privileges across user, computer, and task. That is, if a given task requires more privilege than what a specific computer is trusted to host, then even an otherwise authorized user will be blocked from performing that task on that computer. Similarly, if the computer has sufficient trust for a given task but the network user account does not, execution of that step will likewise be denied. The system manages privilege based on software development tasks.

Figure 1:
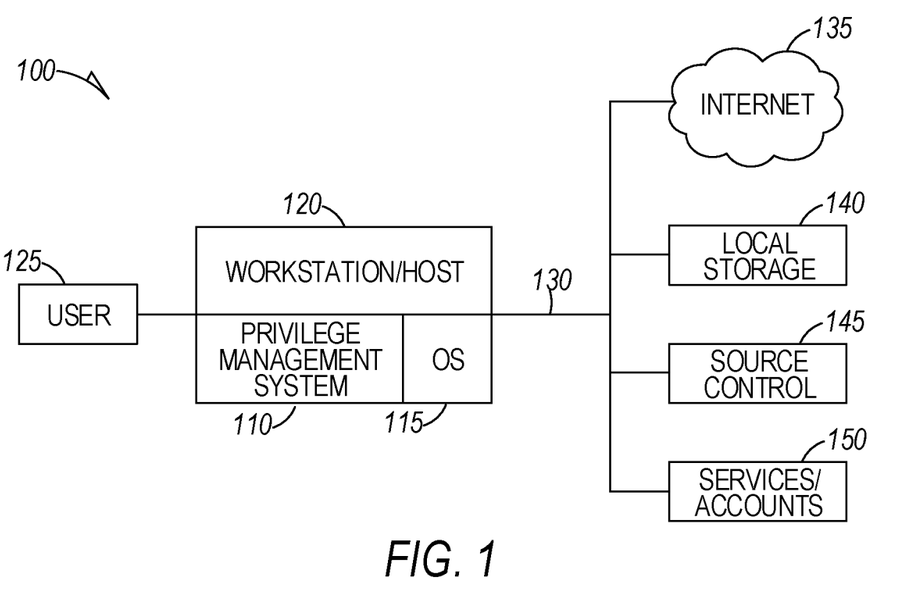
FIG. 1 is a block diagram of a development system incorporating a task and activity-based privilege management system according to an example embodiment.

FIG. 1 is a block diagram of a development system 100 incorporating a just in time or task and activity-based privilege management system 110. System 110 may be at least partially implemented at a kernel level of an operating system (OS) 115 of a workstation or host 120. The host 120 is used by a user 125 interacting with input and output devices associated with the host 120. In various examples, the user 125 may be developing software while accessing various computing resources, information resources, accounts, and other resources to help in the development.

The privilege management system 110 monitors the activity and grants privileges to the resources based on the development tasks currently being performed. The host 120 may have access to multiple resources, including resources accessed through a network connection 130 to the Internet 135, local storage 140, development environment source control 145, and other services and accounts 150.

Figure 2:
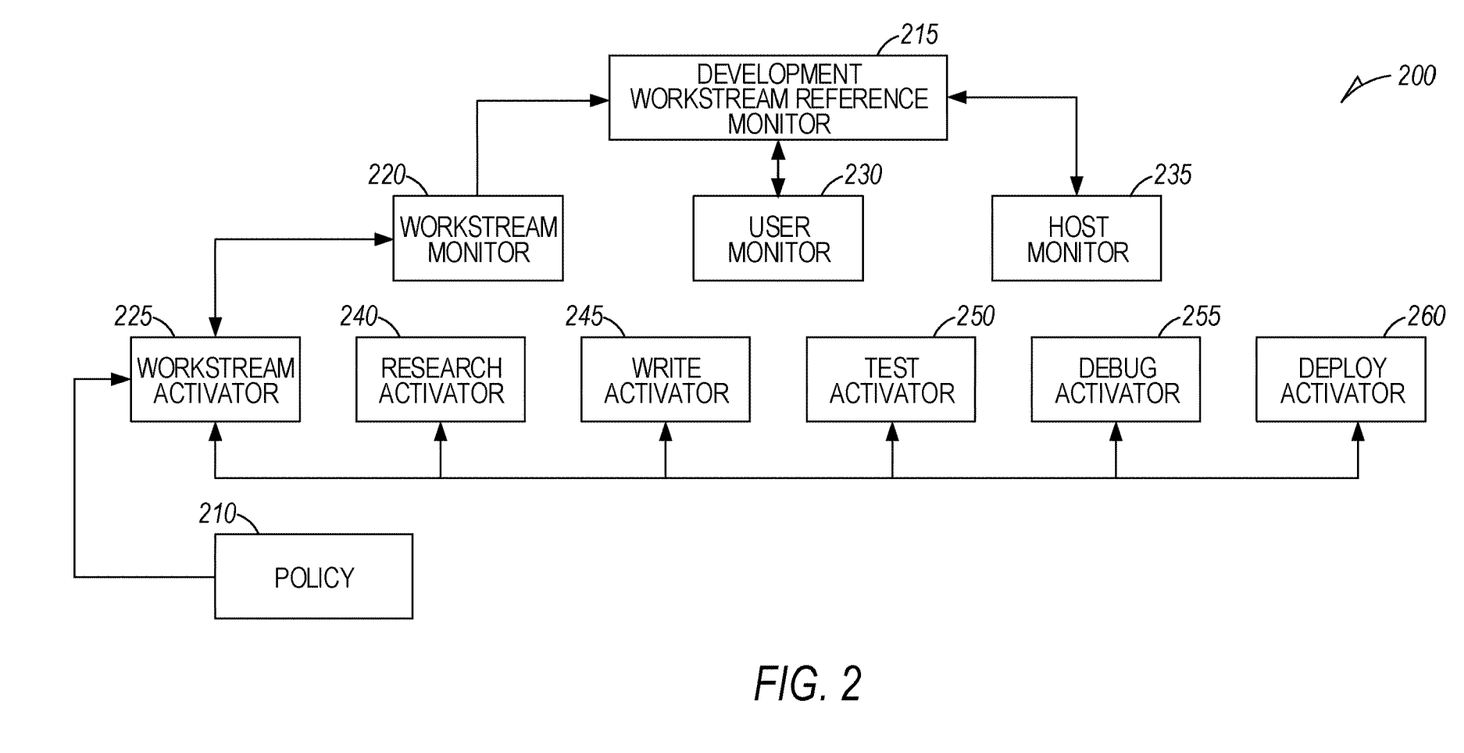
FIG. 2 is a component diagram of a privilege management system according to an example embodiment.

FIG. 2 is a component diagram of a privilege management system 200 according to an example embodiment. The components of system 200 utilize a policy 210 that includes rules defined by the system 200 and that may be customized by a security system administrator. The policy 210 is used by other components to grant privileges based on the software development tasks being performed in a workstream related to developing software. Policy 210 includes defined workstreams. Each defined workstream has attributes, including a workstream name, a list of authorized programs, a list of authorized users, and a list of authorized computers. Policy 210 may be stored in a format that is easy to access, such as a JSON file. Policy 210 is also stored in a secure network location that is readable by software engineering team users and writable only by the security system administrator.

Security reference monitors are the most privileged components of the system. The monitors track the activity of a user and host workstation that the user is working on to develop software. Host workstation tracking may be done at the level of the operating system. Example activities that are tracked include but are not limited to user originated actions, and actions originated by the host operating system and other host system components.

System 200 includes a development workstream reference monitor 215 that receives input from other monitors, including a workstream monitor 220, a user monitor 230 and a host monitor 235. Any activity that is attempted that is inconsistent with the privilege level defined in the policy 210 is blocked.

Development workstream reference monitor 215 is the most privileged component of the system and acts as a microkernel to provide mechanisms for low-level address space management, thread management, and inter-process communication (IPC). Development workstream reference monitor 215 receives input from the workstream monitor 220 regarding activities that the user and host computer should be allowed to perform. That information is updated as necessary when either the policy 210 rules of the system 200 change or the user switches workstreams.

The development workstream reference monitor 215 receives input from the user monitor 230 and host monitor 235 regarding activities that the user and workstation are performing. These activities are at the granularity of interactions with operating system (OS) objects including processes, threads, files and folders, and the network. In response, the development workstream reference monitor 215 indicates whether those interactions are permitted.

The development workstream reference monitor 215 is implemented as a kernel module (i.e., or driver, depending on the platform). The mapping between active policy and allowable operating system actions may be stored as a lookup table. Interactions between the workstream monitor 220, user monitor 230, and host monitor 235 and the development workstream reference monitor 215 are implemented as kernel-to-kernel interrupt requests in one example.

The workstream monitor 220 is the interface between the development workstream reference monitor 215 and multiple activators that keep track of multiple different tasks that are being performed in the development of software.

The workstream monitor 220 is implemented as a system daemon (i.e., or user-mode system service, depending on the development platform). As input, the workstream monitor 220 receives policy 210 definition information (i.e., parsed into binary for efficient processing in the kernel) from a workstream activator 225. The workstream monitor 220 also receives state information from the workstream activator 225, describing which of the policy-defined workstreams the user is in. Input to the workstream monitor may be received via inter-process communication.

As output, the workstream monitor 220 passes the policy definition for the active user workstream to the development workstream reference monitor 215. The policy definition may be passed via a system call in one example.

The user monitor 230 receives notifications of user originated actions and calls the development workstream reference monitor 215 to determine if each action should be allowed.

The user monitor 230 may be implemented as a kernel module. Inputs to the user module 230 are via operating system notification hooks for user logon and logoff and keyboard and mouse activity. On some development platforms, certain operating system activity notifications are more easily received in user mode. In this case, the system 200 accepts such notifications into the workstream monitor instead, and then provides the notifications to the appropriate kernel monitor via a system call.

As output, the user monitor 230 calls the development workstream reference monitor 215 in response to operating system notifications. The call is performed via interrupt request packets between the two kernel modules. In response, the development workstream reference monitor 215 returns Allow or Deny based on the active policy 210. If the development workstream reference monitor 215 response is Allow, the user monitor allows the operating system activity to continue.

If the development workstream reference monitor 215 response is Deny, the user monitor prevents the OS activity (i.e., the subject of the notification). The net result is that a status code of "access denied" is returned to the component or application that initiated the activity (e.g., a user attempt to start a program; a third-party daemon attempt to connect to the internet; etc.).

The host monitor 235 receives notifications of actions originated by the host operating system, including other system components. The host monitor 235 calls the development workstream reference monitor 215 to determine if each action should be allowed.

The host monitor 235 is implemented as a kernel module. Inputs to the host monitor 235 are via operating system notification hooks for process and thread creation, network flow creation, and datagram send. Otherwise, the behavior of the host monitor is like that of the user monitor, above.

System 200 include multiple activators, including the workstream activator 225, a research activator 240, a write activator 245, a task activator 250, a debug activator 255, and a deploy activator 260. The activators are sequencers for the software developer's workflow. The activators accept explicit and implicit inputs to correlate between the user's actions and the state of the system 200.

The workstream activator 225 is the interface between the other activators, monitors, and external entities that can be used to guide and control the system 200.

For example, suppose the user is researching the use of a given programming language and toolchain to meet a line of business software need. In response, the research activator 240 has been the primary interface between user inputs and the workstream activator 240. If the user starts writing code using that same language, the write activator 245 will detect this, notify the workstream activator 225, and take the lead. This is an acceptable transition since the user has stayed within the allowable policy flow of that workstream.

Continuing the example, suppose the user instead starts compiling or executing a project written with a different programming language. The write activator 245 and the test activator 250 will detect this and, via the workstream activator 240 and workstream monitor 220, notify the user that an invalid transition has been attempted. The compilation process will be blocked by the write activator 245.

The workstream activator 225 is implemented as a daemon. As input, workstream activator 225 receives notifications from the other activators about the activity that they are observing. If the activators indicate that the user has switched tasks within the workstream, the workstream activator 225 notifies the workstream monitor 220 of this fact. This allows the corresponding policy state change to be made by the workstream monitor 220 and enforced by the development workstream reference monitor 215.

Although the intent of the system 200 is to stay out of the way of a well-intentioned user, system 200 intentionally provides as narrow a window of opportunity as possible for unauthorized actions to take place during state transitions within the workstream.

The research activator 240 signals that the user is performing tasks that can be characterized as research. Research tasks include reading internet websites and downloading and reviewing software source code and documents.

The research activator 240 may be implemented as a shared library (e.g., shared object or dynamic link library, depending on the platform). Developer tools and other applications that have been extended to support system 200 may do so by integrating with the activators (e.g., loading and calling them explicitly). For applications that have not been extended to support privilege management by system 200, the activators are injected into the host process upon launch. Either way, the activators provide hints both to the workstream activator 225 and to the user about the state of the workstream from the perspective of privilege controlled by system 200.

In one example, a user is engaged in research activity for a C++ programming language project and an attempt is made to debug a Python script. This attempt will be blocked at the operating system level by the user monitor 230 via development workstream reference monitor 215. In response, the research activator 240 provides a helpful warning to the user indicating what just happened and why.

In a related example, the user is engaged in research activity for a JScript programming language project and an attempt is made to launch an editor or integrated development environment that is defined by policy 210 to support Java. This operation will be allowed, so no additional contextual prompting of the user is required.

The write activator 245 signals that the user is performing tasks that can be characterized as writing code. Otherwise, regarding implementation and behavior, the write activator 245 is like the research activator 240.

The test activator 250 signals that the user is performing tasks that can be characterized as testing. Testing tasks include repeatedly executing the work on the host system or in a preproduction environment. Otherwise, regarding implementation and behavior, the test activator 250 is like the research activator 240.

The debug activator 255 signals that the user is performing tasks that can be characterized as debugging code. Otherwise, regarding implementation and behavior, the debug activator 255 is like the research activator 240.

The deploy activator 260 signals that the user is performing tasks that can be characterized as deployment into a production pipeline or runtime environment. Otherwise, regarding implementation and behavior, the deploy activator 260 is like the research activator 240.

Figure 3:
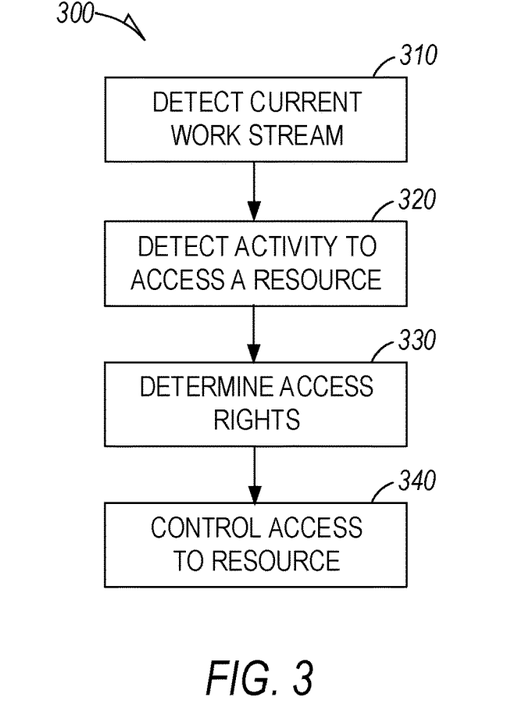
FIG. 3 is a flowchart illustrating a computer implemented method of controlling access to resources based on activities being performed in the context of a current development workstream according to an example embodiment.

FIG. 3 is a flowchart illustrating a computer implemented method 300 of controlling access to resources based on activities being performed in the context of a current development workstream utilizing the privilege management system. Method 300 begins at operation 310 by detecting a current workstream of development tasks associated with a software development project.

Operation 320 detects an activity attempting to access a resource. Detecting an activity may include detecting a user activity or an activity initiated by a host that the user is using. Multiple activators may be used for characterizing activity as at least one of research activity, write activity, test activity, debug activity, and deploy activity. The characterized activity may be collected by a daemon comprising a workstream activator.

Operation 330 determines access rights to the resource with respect to the activity as a function of the current workstream of development tasks. The access rights may indicate that access is allowed, or that access is denied.

In one example, operation 330 determines access rights by accessing a policy that includes defined workstream names, lists of authorized programs, lists of authorized users, and list of authorized computers. Given the current workstream, if the activity is associated with items on the lists for that workstream, the access rights will be access allowed. If not, the access rights will be access denied. In one example, the policy includes a lookup table mapping activity to operating system interactions. Such lookup table will be used when the activity comprises an interaction with an operating system object.

Operation 340 controls access to the resource in accordance with the access rights. In one example, the activity comprises a research activity that includes an attempt to debug a program written in a first language using a debugger for a second language. In this example, the access right will be determined as access denied, in which case access to the resource will not be allowed.

Figure 4:
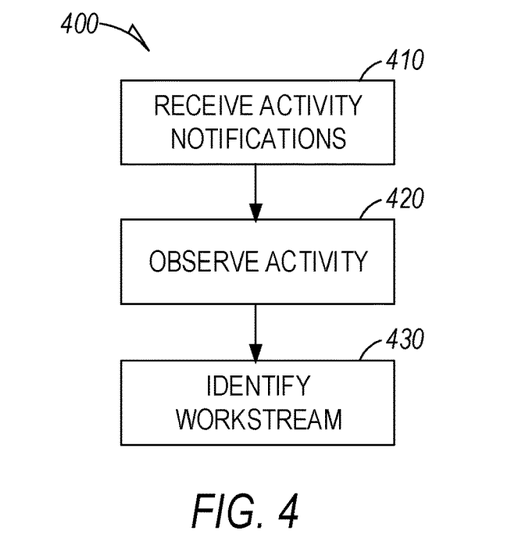
FIG. 4 is a flowchart illustrating a computer implemented method 400 of detecting a current workstream of development tasks according to an example embodiment.

FIG. 4 is a flowchart illustrating a computer implemented method 400 of detecting a current workstream of development tasks. Method 400 begins at operation 410 by receiving notifications from activators regarding observed activity. Operation 420 determines that the observed activity is indicative of tasks associated with the development workstream. Operation 430 provides an identification of the development workstream to use in determining access rights.

For example, in an organization using a work ticketing system, ticket assignment is the basis of user workstream policy. A ticket is associated with either an existing project component (e.g., to fix a bug) or one that is yet to be written (e.g., to implement a new feature). When the ticket is assigned to a user, this information is incorporated into policy 210 and is available to the workstream activator 225 and monitor 220 components. When the user starts work on tasks relating to the ticket, privilege is automatically granted according to a workflow that is consistent with the user(s), computer(s), programming language(s), and toolchain(s) conferred by the ticket.

If an attempt is made by the user, or by some other application resident on the workstation, to access a remote host other than those indicated by the scope of the assigned ticket, then this action will be denied by the host monitor 235. An error condition reporting the network connection failure will be indicated by one of the activators.

Figure 5:
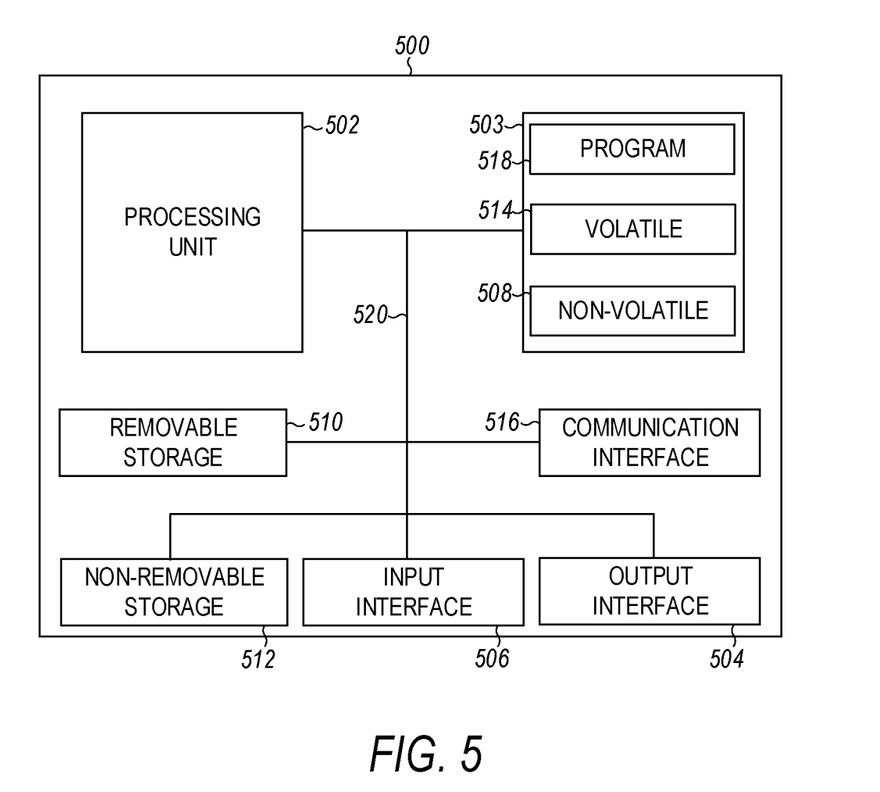
FIG. 5 is a block schematic diagram of a computer system to implement one or more example embodiments.

FIG. 5 is a block schematic diagram of a computer system 500 to dynamically control access to resources during software development and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

Examples:

1. A computer implemented method includes detecting a current workstream of development tasks associated with a software development project, detecting an activity attempting to access a resource, determining access rights to the resource with respect to the activity as a function of the current workstream of development tasks, and controlling access to the resource in accordance with the access rights.

2. The method of claim 1 wherein the access rights comprise access allowed or access denied.

3. The method of any of claims 1-2 wherein determining access rights comprises accessing a policy that includes defined workstream names, lists of authorized programs, lists of authorized users, and a list of authorized computers.

4. The method of claim 3 wherein the activity comprises an interaction with an operating system object.

5. The method of claim 4 wherein the policy includes a lookup table that maps activity to operating system interactions.

6. The method of any of claims 1-5 wherein detecting a current workstream of development tasks includes receiving notifications from activators regarding observed activity, determining the observed activity is indicative of tasks associated with the development workstream, and providing an identification of the development workstream to use in determining access rights.

7. The method of any of claims 1-6 wherein the activity comprises a research activity that includes an attempt to debug a program written in a first language using a debugger for a second language, and wherein access to the debugger is denied.

8. The method of any of claims 1-7 wherein detecting an activity comprises detecting a user activity or an activity initiated by a host that the user is using.

9. The method of any of claims 1-8 and further comprising using multiple activators for characterizing activity as at least one of research activity, write activity, test activity, debug activity, and deploy activity.

10. The method of claim 9 wherein the characterized activity is collected by a daemon comprising a workstream activator.

11. A machine-readable storage device has instructions for execution by a processor of a machine to cause the processor to perform operations to perform a method. The operations include detecting a current workstream of development tasks associated with a software development project, detecting an activity attempting to access a resource, determining access rights to the resource with respect to the activity as a function of the current workstream of development tasks, and controlling access to the resource in accordance with the access rights.

12. The device of claim 11 wherein the access rights include access allowed or access denied.

13. The device of any of claims 11-12 wherein determining access rights includes accessing a policy that includes defined workstream names, lists of authorized programs, lists of authorized users, and list of authorized computers.

14. The device of claim 13 wherein the activity includes an interaction with an operating system object.

15. The device of claim 14 wherein the policy includes a lookup table mapping activity to operating system interactions.

16. The device of any of claims 11-15 wherein detecting a current workstream of development tasks includes receiving notifications from activators regarding observed activity, determining the observed activity is indicative of tasks associated with the development workstream, and providing an identification of the development workstream to use in determining access rights.

17. The device of any of claims 11-16 wherein the activity includes a research activity that includes an attempt to debug a program written in a first language using a debugger for a second language, and wherein access to the debugger is denied.

18. The device of any of claims 11-17 wherein the operations further include using multiple activators for characterizing activity as at least one of research activity, write activity test activity, debug activity, and deploy activity, wherein the characterized activity is collected by a daemon comprising a workstream activator.

19. A device includes a processor and a memory device coupled to the processor and having a program stored thereon for execution by the processor to perform operations. The operations include detecting a current workstream of development tasks associated with a software development project, detecting an activity attempting to access a resource, determining access rights to the resource with respect to the activity as a function of the current workstream of development tasks, and controlling access to the resource in accordance with the access rights.

20. The device of claim 19 wherein the access rights include access allowed or access denied, and wherein detecting a current workstream of development tasks includes receiving notifications from activators regarding observed activity, determining the observed activity is indicative of tasks associated with the development workstream, and providing an identification of the development workstream to use in determining access rights.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   detecting a current workstream of development tasks associated with a software development project;
   detecting an activity, being performed on the computer, attempting to access a resource;
   determining access rights to the resource with respect to the activity as a function of a workstream policy associated with the current workstream of development tasks using a first activator of a plurality of activators, each activator associated with a different type of activity, the first activator associated with a current task in the current workstream of development tasks; and preventing the activity from accessing the resource in accordance with the access rights in response to the activity being inconsistent with the workstream policy.

2. The method of claim 1 wherein the access rights comprise access allowed or access denied for activities that transition to a different type of task.

3. The method of claim 1 wherein the workstream policy includes defined workstream names, lists of authorized programs, lists of authorized users, and a list of authorized computers.

4. The method of claim 3 wherein the activity comprises an interaction with an operating system object.

5. The method of claim 4 wherein the workstream policy includes a lookup table that maps activity to operating system interactions.

6. The method of claim 1 wherein detecting a current workstream of development tasks comprises:
   receiving notifications from at least one of the plurality of activators regarding observed activity;
   determining the observed activity is indicative of tasks associated with the development workstream; and
   providing an identification of the development workstream to use in determining access rights.

7. The method of claim 1 wherein the activity comprises a research activity that includes an attempt to debug a program written in a first language using a debugger for a second language, and wherein access to the debugger is denied based on detection of an invalid task transition by a debug activator.

8. The method of claim 1 wherein detecting an activity comprises detecting a user activity or an activity initiated by a host that the user is using.

9. The method of claim 1 and further comprising using the plurality of activators for characterizing activity as at least one of research activity, write activity, test activity, debug activity, and deploy activity.

10. The method of claim 9 wherein the characterized activity is collected by a daemon comprising a workstream activator.

11. A machine-readable storage device having instructions for execution by a processor of a machine to cause the processor to perform operations to perform a method, the operations comprising:
   detecting a current workstream of development tasks associated with a software development project;
   detecting an activity attempting to access a resource;
   determining access rights to the resource with respect to the activity as a function of a workstream policy associated with the current workstream of development tasks using a first activator of a plurality of activators, each activator associated with a different type of activity, the first activator associated with a current task in the current workstream of development tasks; and
   controlling access to the resource in accordance with the access rights in response to the activity being inconsistent with the workstream policy.

12. The device of claim 11 wherein the access rights comprise access allowed or access denied for activities that transition to a different type of task.

13. The device of claim 11 wherein the workstream policy includes defined workstream names, lists of authorized programs, lists of authorized users, and a list of authorized computers.

14. The device of claim 13 wherein the activity comprises an interaction with an operating system object.

15. The device of claim 14 wherein the workstream policy includes a lookup table mapping activity to operating system interactions.

16. The device of claim 11 wherein detecting a current workstream of development tasks comprises:
   receiving notifications from at least one of the plurality of activators regarding observed activity;
   determining the observed activity is indicative of tasks associated with the development workstream; and
   providing an identification of the development workstream to use in determining access rights.

17. The device of claim 11 wherein the activity comprises a research activity that includes an attempt to debug a program written in a first language using a debugger for a second language, and wherein access to the debugger is denied based on detection of an invalid task transition by a debug activator.

18. The device of claim 11 and further comprising using the plurality of activators for characterizing activity as at least one of research activity, write activity, test activity, debug activity, and deploy activity, wherein the characterized activity is collected by a daemon comprising a workstream activator.

19. A device comprising:
   a processor; and
   a memory device coupled to the processor and having a program stored thereon for execution by the processor to perform operations comprising:
   detecting a current workstream of development tasks associated with a software development project;
   detecting an activity attempting to access a resource;
   determining access rights to the resource with respect to the activity as a function of a workstream policy associated with the current workstream of development tasks using a first activator of a plurality of activators, each activator associated with a different type of activity, the first activator associated with a current task in the current workstream of development tasks; and
   controlling access to the resource in accordance with the access rights in response to the activity being inconsistent with the workstream policy.

20. The device of claim 19 wherein the access rights comprise access allowed or access denied, and wherein detecting a current workstream of development tasks comprises:
   receiving notifications from an activator regarding observed activity;
   determining the observed activity is indicative of tasks associated with the development workstream; and
   providing an identification of the development workstream to use in determining access rights.

* * * * *